United States Patent
Hwang et al.

(10) Patent No.: US 7,710,841 B2
(45) Date of Patent: *May 4, 2010

(54) METHOD OF RECORDING TEMPORARY DEFECT LIST ON WRITE-ONCE RECORDING MEDIUM, METHOD OF REPRODUCING THE TEMPORARY DEFECT LIST, RECORDING AND/OR REPRODUCING APPARATUS, AND THE WRITE-ONCE RECORDING MEDIUM

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/769,163

(22) Filed: Jun. 27, 2007

(65) Prior Publication Data

US 2007/0247992 A1 Oct. 25, 2007

Related U.S. Application Data

(63) Continuation of application No. 10/831,372, filed on Apr. 26, 2004.

(30) Foreign Application Priority Data

Apr. 30, 2003 (KR) ................................ 2003-27542
Mar. 8, 2004 (KR) ................................ 2004-15602

(51) Int. Cl.
*G11B 20/18* (2006.01)

(52) U.S. Cl. .............. 369/47.14; 369/53.15; 369/53.17; 714/5; 714/7; 714/42; 714/723; 714/747; 711/134

(58) Field of Classification Search .............. 369/47.14, 369/53.15, 53.17; 714/5, 7, 42, 723, 747; 711/134

See application file for complete search history.

(56) References Cited

U.S. PATENT DOCUMENTS 5,111,444 A * 5/1992 Fukushima et al. ...... 369/53.17

(Continued)

FOREIGN PATENT DOCUMENTS

CN    1381839    11/2002

(Continued)

OTHER PUBLICATIONS

U.S. Appl. No. 10/831,372, filed Apr. 26, 2004, Sung-hee Hwang, Samsung Electronics Co., Ltd.

(Continued)

*Primary Examiner*—Wayne R Young
*Assistant Examiner*—Linh T Nguyen
(74) *Attorney, Agent, or Firm*—NSIP Law

(57) ABSTRACT

A method of recording a temporary defect list on a write-once recording medium, a method of reproducing the temporary defect list, an apparatus for recording and/or reproducing the temporary defect list, and the write-once recording medium. The method of recording a temporary defect list for defect management on a write-once recording medium includes recording the temporary defect list, which is created while data is recorded on the write-once recording medium, in at least one cluster of the write-once recording medium, and verifying if a defect is generated in the at least one cluster. Then, the method includes re-recording data originally recorded in a defective cluster in another cluster, and recording pointer information, which indicates a location of the at least one cluster where the temporary defect list is recorded, on the write-once recording medium.

18 Claims, 6 Drawing Sheets

U.S. PATENT DOCUMENTS

| | | | |
|---|---|---|---|
| 5,235,585 A * | 8/1993 | Bish et al. | 369/53.17 |
| 5,319,626 A * | 6/1994 | Ozaki et al. | 369/53.17 |
| 6,223,302 B1 * | 4/2001 | Nakamura et al. | 714/8 |
| 6,314,078 B1 | 11/2001 | Takagi et al. | |
| 6,367,038 B1 | 4/2002 | Ko | |
| 6,385,148 B2 | 5/2002 | Ito et al. | |
| 6,581,167 B1 * | 6/2003 | Gotoh et al. | 714/7 |
| 6,606,285 B1 * | 8/2003 | Ijtsma et al. | 369/47.1 |
| 6,615,363 B1 * | 9/2003 | Fukasawa | 714/5 |
| 7,002,882 B2 | 2/2006 | Takahashi | |
| 7,203,153 B2 | 4/2007 | Kuraoka et al. | |
| 7,463,562 B2 | 12/2008 | Hwang et al. | |
| 2002/0136537 A1 | 9/2002 | Takahashi | |
| 2006/0077827 A1 | 4/2006 | Takahashi | |
| 2008/0094959 A1 * | 4/2008 | Hwang et al. | 369/47.14 |
| 2008/0094960 A1 * | 4/2008 | Hwang et al. | 369/47.14 |
| 2008/0094961 A1 * | 4/2008 | Hwang et al. | 369/47.14 |
| 2008/0094962 A1 * | 4/2008 | Hwang et al. | 369/47.14 |
| 2008/0094963 A1 * | 4/2008 | Hwang et al. | 369/47.14 |
| 2008/0094964 A1 * | 4/2008 | Hwang et al. | 369/47.14 |
| 2008/0094965 A1 * | 4/2008 | Hwang et al. | 369/47.14 |
| 2008/0094966 A1 * | 4/2008 | Hwang et al. | 369/47.14 |
| 2008/0094967 A1 * | 4/2008 | Hwang et al. | 369/47.14 |
| 2008/0094968 A1 * | 4/2008 | Hwang et al. | 369/47.14 |
| 2008/0094978 A1 * | 4/2008 | Hwang et al. | 369/53.17 |
| 2008/0094997 A1 * | 4/2008 | Hwang et al. | 369/100 |

FOREIGN PATENT DOCUMENTS

| | | |
|---|---|---|
| CN | 1168089 | 9/2004 |
| EP | 0 350 920 A2 | 1/1990 |
| JP | 6-338139 | 12/1994 |
| JP | 9-167446 | 6/1997 |
| JP | 11-39801 | 2/1999 |
| JP | 2004-280864 A | 10/2004 |
| KR | 2000-0015037 | 3/2000 |

OTHER PUBLICATIONS

U.S. Appl. No. 11/962,453, filed Dec. 21, 2007, Sung-hee Hwang, Samsung Electronics Co., Ltd.

U.S. Appl. No. 11/962,490, filed Dec. 21, 2007, Sung-hee Hwang, Samsung Electronics Co., Ltd.

U.S. Appl. No. 11/962,539, filed Dec. 21, 2007, Sung-hee Hwang, Samsung Electronics Co., Ltd.

U.S. Appl. No. 11/962,649, filed Dec. 21, 2007, Sung-hee Hwang, Samsung Electronics Co., Ltd.

U.S. Appl. No. 11/962,724, filed Dec. 21, 2007, Sung-hee Hwang, Samsung Electronics Co., Ltd.

U.S. Appl. No. 11/962,755, filed Dec. 21, 2007, Sung-hee Hwang, Samsung Electronics Co., Ltd.

U.S. Appl. No. 11/962,784, filed Dec. 21, 2007, Sung-hee Hwang, Samsung Electronics Co., Ltd.

U.S. Appl. No. 11/962,820, filed Dec. 21, 2007, Sung-hee Hwang, Samsung Electronics Co., Ltd.

U.S. Appl. No. 11/962,927, filed Dec. 21, 2007, Sung-hee Hwang, Samsung Electronics Co., Ltd.

U.S. Appl. No. 11/962,978, filed Dec. 21, 2007, Sung-hee Hwang, Samsung Electronics Co., Ltd.

U.S. Appl. No. 11/963,056, filed Dec. 21, 2007, Sung-hee Hwang, Samsung Electronics Co., Ltd.

U.S. Appl. No. 11/963,140, filed Dec. 21, 2007, Sung-hee Hwang, Samsung Electronics Co., Ltd.

Office Action issued in Chinese Patent Application No. 2004800014155 on Aug. 4, 2006.

Examination Report issued in Indian Patent Application No. 22502/MUMNP/2006 on Feb. 11, 2008.

International Search Report issued in International Application No. PCT/KR2004/000986 on Apr. 29, 2004.

Japanese Office Action issued Jan. 27, 2009 in the related Japanese Application No. 2006-507828.

Substantive Examination Adverse Report of the Malaysian Patent Application No. PI20041533 issued on Apr. 10, 2009.

English Abstract of CN 1274462.

Office Action issued by the State Intellectual Property Office of the People's Republic of China on Mar. 6, 2009.

* cited by examiner

| PSN OF FIRST SECTOR OF DEFECTIVE CLUSTER | PSN OF FIRST SECTOR OF REPLACEMENT CLUSTER |
|---|---|
| 100h | 11FFFh |
| 101h | 11FFFh |
| 102h | 11FFDh |
| ... | |
| 1FDh | 11F01h |
| 1FFh | 11F00h |

METHOD OF RECORDING TEMPORARY DEFECT LIST ON WRITE-ONCE RECORDING MEDIUM, METHOD OF REPRODUCING THE TEMPORARY DEFECT LIST, RECORDING AND/OR REPRODUCING APPARATUS, AND THE WRITE-ONCE RECORDING MEDIUM

CROSS-REFERENCE TO RELATED APPLICATIONS

This application is a continuation of U.S. patent application Ser. No. 10/831,372 filed Apr. 26, 2004, now pending, the disclosure of which is incorporated herein in its entirety by reference. This application also claims the priority of Korean Patent Application No. 2003-27542, filed on Apr. 30, 2003 in the Korean Intellectual Property Office, and Korean Patent Application No. 2004-15602, filed on Mar. 8, 2004, respectively, in the Korean Intellectual Property Office, the disclosures of which are incorporated herein by reference.

BACKGROUND OF THE INVENTION

1. Field of the Invention

The present invention relates to a write-once recording medium, and more particularly, to a method of recording a temporary defect list on a write-once recording medium, a method of reproducing the temporary defect list, an apparatus for recording and/or reproducing the temporary defect list, and the write-once recording medium.

2. Description of the Related Art

Defect management involves recording data, which has been recorded at a location of a recording medium where a defect is generated, at another location of the recording medium when the data cannot be reproduced normally, thereby preventing data loss caused by the generation of the defect.

Conventionally, defect management is classified into defect management using a linear replacement method and that using a slipping replacement method. The linear replacement method is the replacement of a data area where a defect is generated with a spare area of the data area where a defect is not generated. The slipping replacement method is not using the data area where the defect is generated, and skipping to and using a next data area where no defect is generated.

The linear replacement and slipping replacement methods have been mainly applied to discs, such as DVD-RAM/RW (digital versatile disk-random access memory/rewritable), on which data can be re-recorded and which allow recording by random access.

Recently, several solutions have been considered to perform defect management using a data recording and/or reproducing apparatus in a write-once recording medium in which data cannot be eliminated or erased once the data is written.

Defect management for write-once recording media using linear replacement will now be described in detail. A data recording and/or reproducing apparatus that receives a user data recording command and user data from a host records the user data in cluster units, which are data recording units. After the data recording and/or reproducing apparatus performs a verify-after-write operation, if a defect is generated in a cluster of a user data area where the user data is recorded, the data recording and/or reproducing apparatus records the user data in a spare area included in a data area.

During a predetermined time interval when data is being recorded, or after completion of single data recording, the data recording and/or reproducing apparatus creates a temporary defect list (hereinafter referred to as a TDFL) containing location information of clusters of the user data area where defects are generated and location information of replacement clusters of the spare area where the user data recorded in the defective clusters is rewritten. Then, the data recording and/or reproducing apparatus records the created TDFL in a temporary disc management area (hereinafter referred to as a TDMA). Also, after the data recording and/or reproducing apparatus records the created TDFL in the TDMA, it records pointer information indicating the location where the TDFL is recorded.

When the write-once recording medium is re-loaded into the data recording and/or reproducing apparatus, the data recording and/or reproducing apparatus reads out the TDFL from the write-once recording medium and stores the read TDFL in a memory. When additional data is recorded on the write-once recording medium, if new defective clusters are generated, the data recording and/or reproducing apparatus rewrites data recorded in the defective clusters in the replacement clusters of the spare area. Thereafter, in addition to the TDFL stored in the memory, the data recording and/or reproducing apparatus creates an updated TDFL containing location information of the newly-generated defective clusters and location information of replacement clusters corresponding to the newly-generated defective clusters, records the updated TDMA, and records pointer information indicating the location where the updated TDFL is recorded.

When the write-once recording medium is loaded into the data recording and/or reproducing apparatus for the purpose of reproducing the user data, the data recording and/or reproducing apparatus first accesses the TDMA, obtains the pointer information indicating the location where the updated TDFL is recorded, and obtains the updated TDFL. The data recording and/or reproducing apparatus can then reproduce the user data without error by referring to the updated TDFL.

As described above, since the TDFL is critical information for user data reproduction, the TDFL should be recorded with high reliability. Thus, during the recording of the TDFL, the verify-after-write operation is performed in the same way as during the recording of user data. Therefore, if a defective cluster is generated, data recorded in the defective cluster is rewritten in another cluster of the TDMA.

According to the related art, if the size of a TDFL corresponds to at least two clusters and the TDFL is recorded in at least two clusters, the verify-after-write operation is performed and the TDFL is rewritten in other clusters if a defective cluster is generated. However, the TDMA is smaller than the data area and the amount of data that can be stored in the TDMA is not large. Accordingly, when defect management is performed for the TDFL according to the related art, the TDMA is quickly used up.

SUMMARY OF THE INVENTION

An aspect of the present invention provides a method and apparatus for recording a TDFL in a write-once recording medium, with high reliability and improved utilization of an area assigned for recording of the TDFL.

An aspect of the present invention provides a method and apparatus for reproducing a TDFL recorded with high reliability and improved utilization of an area assigned for recording of the TDFL on a write-once recording medium.

An aspect of the present invention provides a write-once recording medium that stores a TDFL with high reliability and improved utilization of an area assigned for recording of the TDFL.

According to an aspect of the present invention, there is provided a method of recording a temporary defect list for defect management in a write-once recording medium, the method including recording the temporary defect list which is created while data is recorded on the write-once recording medium, in at least one cluster of the write-once recording medium and verifying if a defect is generated in the at least one cluster; recording data which is recorded in a defective cluster, in another cluster, and recording pointer information which indicates a location of the at least one cluster where the temporary defect list is recorded, on the write-once recording medium.

Additional aspects and/or advantages of the invention will be set forth in part in the description which follows and, in part, will be obvious from the description, or may be learned by practice of the invention.

In accordance with an aspect of the present invention, the temporary defect list includes location information of a defective cluster and location information of a replacement cluster for replacement of the defective cluster.

According to an aspect of the present invention, the pointer information includes location information of the other cluster instead of the defective cluster.

According to an aspect of the present invention, the pointer information is included in a temporary disc definition structure. The temporary defect list and the temporary disc definition structure may be recorded in a temporary disc management area provided on the write-once recording medium.

According to another aspect of the present invention, there is provided an apparatus for recording and/or reproducing data, the apparatus including a recording/reading unit, which records data on or reads data from a write-once recording medium; and a control unit, which controls the recording/reading unit to record a temporary defect list for defect management, which is created while the data is recorded on the write-once recording medium, in at least one cluster of the write-once recording medium. The control unit further verifies whether a defect is generated in the at least one cluster, controls the recording/reading unit to record data recorded in a defective cluster in another cluster, and controls the recording/reading unit to record pointer information indicating a location of the at least one cluster in which the temporary defect list is recorded on the write-once recording medium.

In accordance with an aspect of the present invention, the temporary defect list includes location information of the defective cluster and location information of a replacement cluster for replacement of the defective cluster.

According to an aspect of the present invention, the pointer information includes location information of the other cluster instead of the defective cluster.

According to an aspect of the present invention, the pointer information is included in a temporary disc definition structure.

According to an aspect of the present invention, the temporary defect list and the temporary disc definition structure are recorded in a temporary disc management area provided on the write-once recording medium.

According to another aspect of the present invention, there is provided a method of reading a temporary defect list recorded on a write-once recording medium for defect management, the method including obtaining pointer information indicating a location where the temporary defect list is recorded from the write-once recording medium; and accessing at least one cluster where the temporary defect list is recorded and reading the temporary defect list, according to the pointer information.

According to an aspect of the present invention, the pointer information indicates a location of the at least one cluster where the temporary defect list is recorded.

According to an aspect of the present invention, the pointer information indicates the location of each of the at least one cluster.

During recording of the temporary defect list, according to an aspect of the present invention, if a defect is generated in the at least one cluster and data is recorded in another cluster, the pointer information may include location information of the other cluster instead of the defective cluster.

In accordance with an aspect of the present invention, the temporary defect list includes location information of a defective cluster and location information of a replacement cluster for replacement of the defective cluster.

In accordance with an aspect of the present invention, the pointer information is included in a temporary disc definition structure. The temporary defect list and the temporary disc definition structure may be recorded in a temporary disc management area provided on the write-once recording medium.

According to another aspect of the present invention, there is provided an apparatus for reproducing data, the apparatus including a reading unit, which reads data recorded on a write-once recording medium; and a control unit, which controls the reading unit to read pointer information indicating a location where a temporary defect list is recorded for defect management from the write-once recording medium, accesses at least one cluster where the temporary defect list is recorded, and reads the temporary defect list, according to the pointer information.

According to an aspect of the present invention, the pointer information indicates a location of the at least one cluster where the temporary defect list is recorded. The pointer information may indicate the location of each of the at least one cluster.

During recording of the temporary defect list, according to an aspect of the present invention, if a defect is generated in the at least one cluster and data is recorded in another cluster, the pointer information includes location information of the other cluster instead of the defective cluster.

In accordance with an aspect of the present invention, the temporary defect list may include location information of a defective cluster and location information of a replacement cluster for replacement of the defective cluster.

In accordance with an aspect of the present invention, the pointer information is included in a temporary disc definition structure. The temporary defect list and the temporary disc definition structure may be recorded in a temporary disc management area provided on the write-once recording medium.

According to another embodiment of the present invention, there is provided a write-once recording medium including at least one user data area for recording user data; at least one spare area for replacement when a defect is generated in the user data area; and at least one temporary disc management area for recording a temporary defect list for defect management and pointer information indicating a location of at least one cluster in which the temporary defect list is recorded.

In accordance with an aspect of the present invention, the temporary defect list includes location information of a defective cluster of the user data area where a defect is generated and location information of a replacement cluster of the spare area for replacement of the defective cluster.

In accordance with an aspect of the present invention, while the temporary defect list is recorded in at least one cluster of the temporary disc management area, if a defect is generated in the at least one cluster and data is recorded in another cluster, the pointer information includes location information of the other cluster instead of the defective cluster. The pointer information may be included in a temporary disc definition structure.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
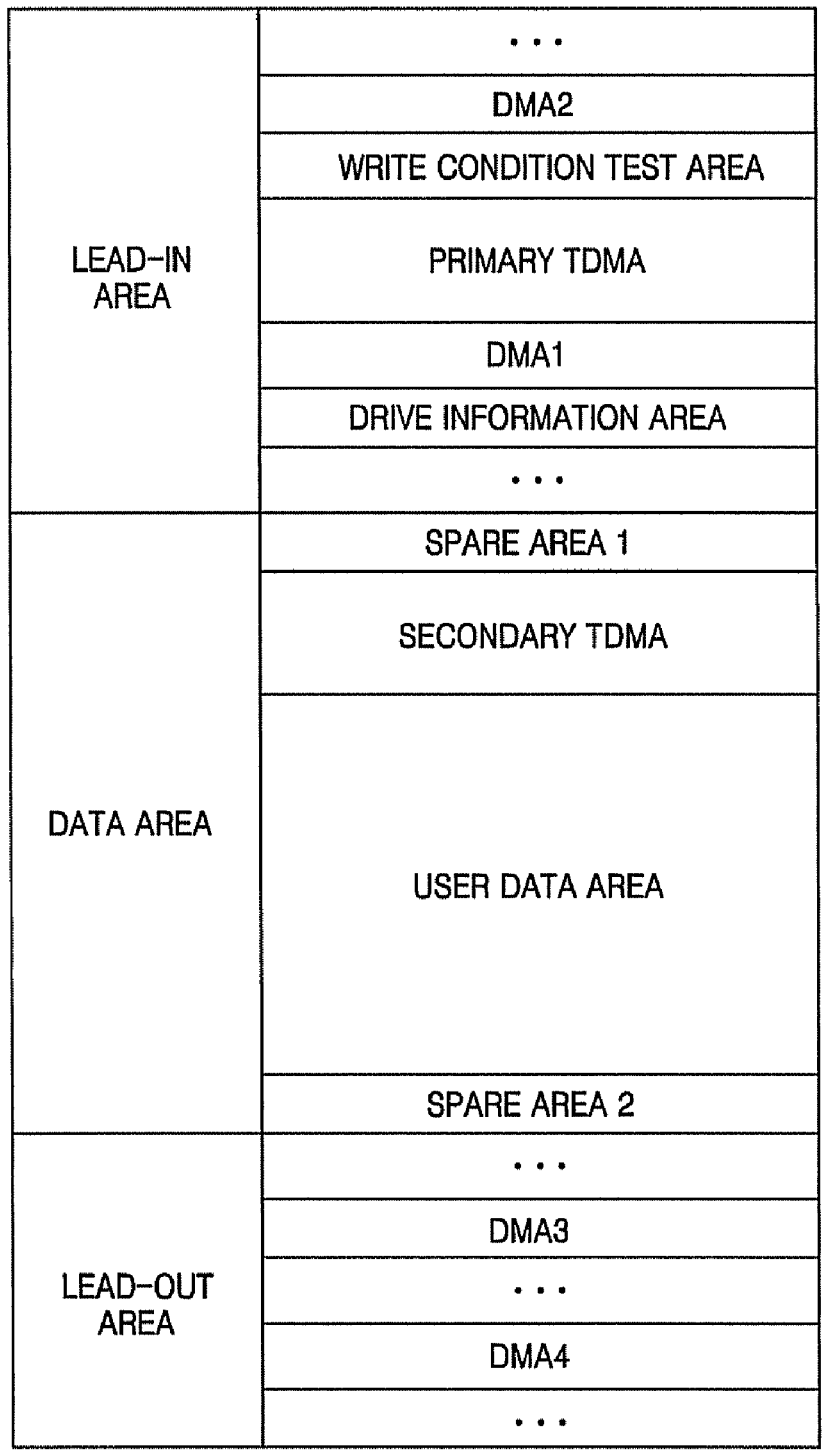
FIG. 1 illustrates the structure of a write-once recording medium according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates the structure of a write-once recording medium 100 according to an embodiment of the present invention. The write-once recording medium 100 shown in FIG. 1 has a single recording layer including a lead-in area, a data area, and a lead-out area.

In the lead-in area, a disc management area 1 (DMA 1), a disc management area 2 (DMA 2), a primary temporary disc management area (TDMA), a write condition test area, and a drive information area are provided. In the data area, a spare area 1 and a spare area 2 for replacement of defective clusters generated in a user data area, a secondary TDMA, and the user data area are provided. In the lead-out area, a disc management area 3 (DMA 3) and a disc management area 4 (DMA 4) are provided.

A TDFL and a temporary disc definition structure (hereinafter referred to as a TDDS) are recorded in the primary TDMA and the secondary TDMA. The TDDS includes recordable location information of the write condition test area, write protection information, and location and/or size information of the spare areas 1 and 2 assigned to the data area. In particular, in an aspect of this embodiment, the TDDS includes pointer information indicating the location of the TDFL. The TDDS and the pointer information indicating the location of the TDFL will be described in detail later.

The TDFL and the TDDS are first recorded in the primary TDMA. After the primary TDMA is totally exhausted, the TDFL and the TDDS are recorded in the secondary TDMA. The secondary TDMA included in the data area may or may not be assigned according to a user command or a command from a data recording and/or reproducing apparatus, so as to enable a user or a manufacturer of the data recording and/or reproducing apparatus to more effectively use the write-once recording medium.

Figure 2:
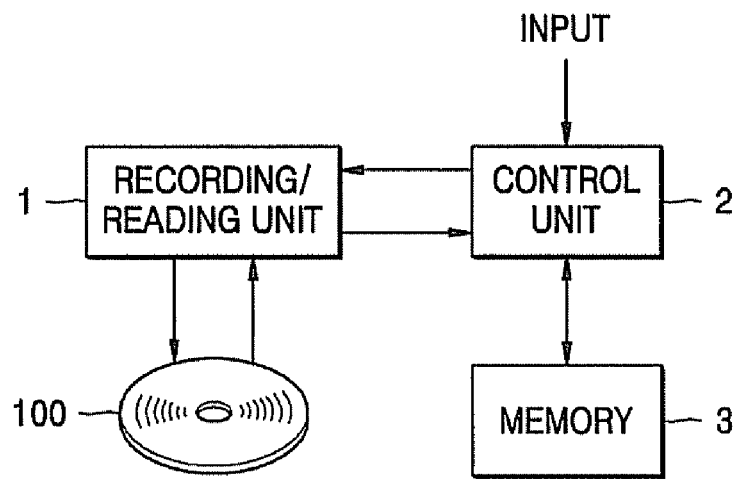
FIG. 2 is a block diagram of a data recording and/or reproducing apparatus according to an embodiment of the present invention.

When the write-once recording medium 100 is loaded into the data recording and/or reproducing apparatus such as that shown in FIG. 2, the data recording and/or reproducing apparatus performs initialization in order to use the write-once recording medium 100. In other words, the data recording and/or reproducing apparatus reads information recorded in the lead-in area and/or lead-out area and determines how to manage the write-once recording medium 100 and record data on or reproduce data from the write-once recording medium 100. As the amount of data recorded in the lead-in area and/or lead-out area increases, the time required for the data recording and/or reproducing apparatus to prepare for a recording or reproduction process after the write-once recording medium 100 is loaded also increases. To solve this and/or other problems, the concepts of the TDDS and the TDFL are introduced.

In other words, before the write-once recording medium 100 is finalized, the TDFL and the TDDS are updated and recorded in the TDMA. After the write-once recording medium 100 is finalized, meaningful updated TDFL and TDDS are recorded as a defect list (DFL) and a disc definition structure (DDS) in one of the DMAs 1 through 4. Also, by recording the meaningful updated TDFL and TDDS in the DMAs 1 through 4, the write-once recording medium 100 can be reproduced in an apparatus for reproducing a rewritable medium 100.

FIG. 2 is a block diagram of a data recording and/or reproducing apparatus according to an embodiment of the present invention. Referring to FIG. 2, the data recording and/or reproducing apparatus includes a recording/reading unit 1, a control unit 2, and a memory 3. A write-once recording medium 100 has the same structure as the write-once recording medium having the single recording layer shown in FIG. 1.

The recording/reading unit 1 records data on and/or reproduces data from the write-once recording medium 100 according to control by the control unit 2. During data recording, to verify recorded data, the recorded data is read out.

The control unit 2 controls overall operation of the data recording and/or reproducing apparatus. Also, as data is recorded on and/or reproduced from the write-once recording medium 100, the control unit 2 creates an updated TDFL, records the updated TDFL on the write-once recording medium 100, and records a TDDS containing pointer information indicating the location of the updated TDFL in the TDMA, thereby performing defect management. While not required, it is understood that the control unit 2 may be a general or special purpose computer.

The updated TDFL and TDDS that are read out from the write-once recording medium 100 are stored in the memory 3 when the write-once recording medium 100 is initialized for use. Thereafter, if new user data is recorded, defect management is performed again, the control unit 2 creates a new updated TDFL including location information of new defective clusters and location information of replacement clusters corresponding to the new defective clusters in the TDFL stored in the memory 3, records the updated TDFL in the TDMA, and records pointer information indicating the location where the updated TDFL is recorded in the TDMA.

A method of recording a TDFL on the write-once recording medium 100 according to an embodiment of the present invention, which is performed by the data recording and/or reproducing apparatus shown in FIG. 2, will now be described in relation to FIG. 3.

Figure 3:
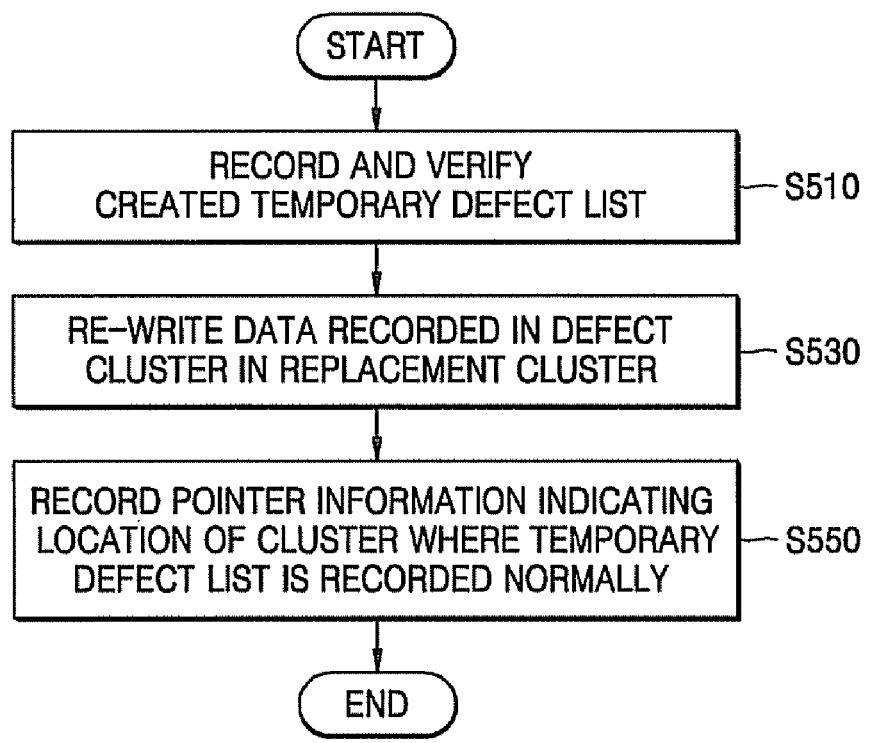
FIG. 3 is a flowchart illustrating a method of recording a TDFL according to an embodiment of the present invention.

FIG. 3 is a flowchart illustrating the method of recording the TDFL according to an embodiment of the present invention.

Although not shown in FIG. 3, when the write-once recording medium 100 is loaded into the data recording and/or reproducing apparatus, initialization is performed in order to use the write-once recording medium 100. In other words, the control unit 2 reads the updated TDFL and TDDS from the write-once recording medium 100 and stores the read TDFL and TDDS in the memory 3.

Thereafter, if user data and a user data recording command are input to the write-once recording medium 100 from a host (not shown), the control unit 2 records the user data on the write-once recording medium 100 in predetermined units and performs a verify-after-write operation to verify the recorded data.

During a predetermined time interval when data is being recorded, or after completion of single data recording, the data recording and/or reproducing apparatus creates a new updated TDFL containing location information of new defective clusters and location information of replacement clusters corresponding to the new defective clusters, records the updated TDFL in the TDMA, and records the TDDS including the pointer information indicating the location where the updated TDFL is recorded in the TDMA.

Figure 4:
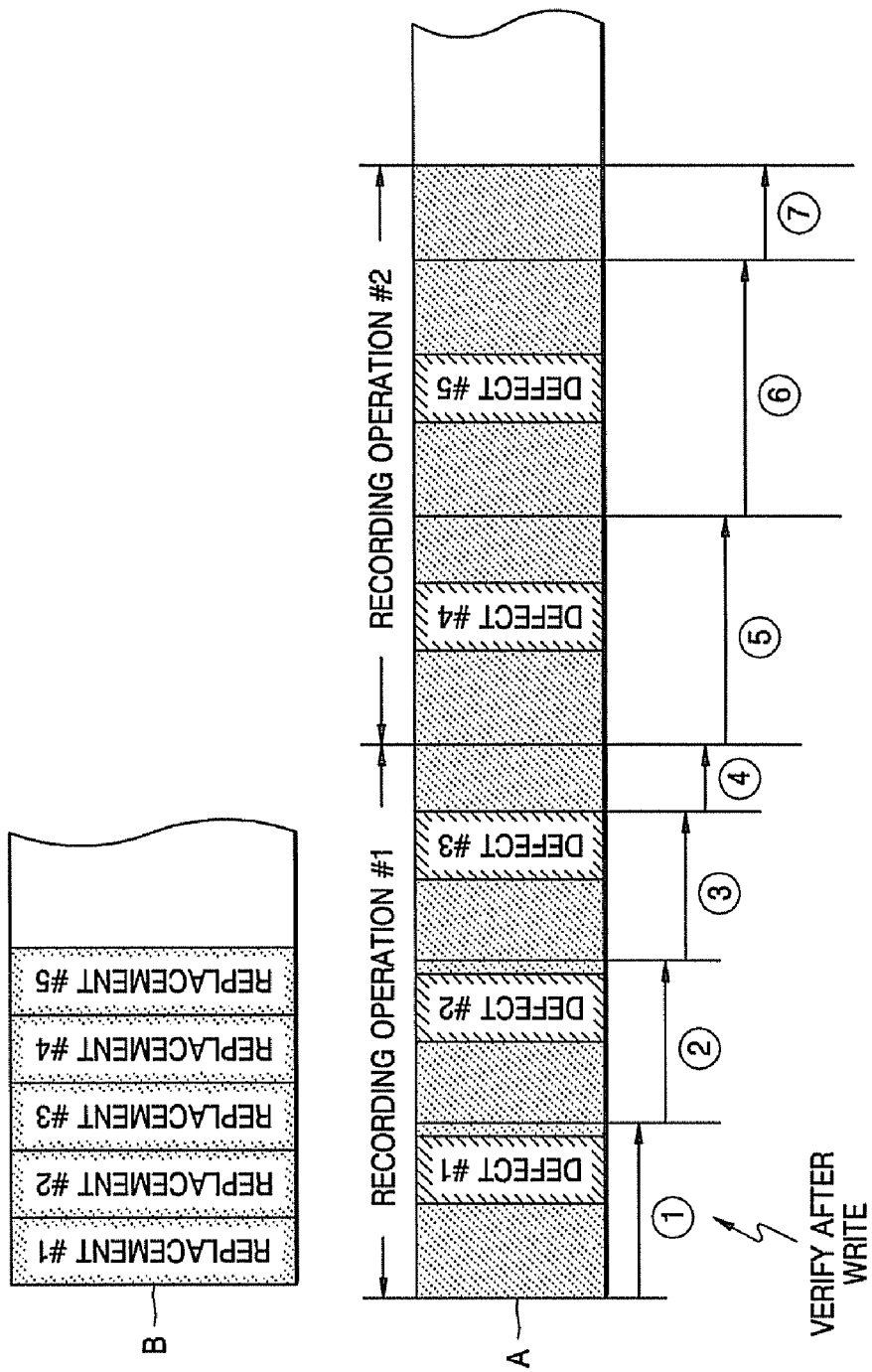
FIG. 4 is a diagram for explaining in detail the creation of the TDFL according to a verify-after-write process.

FIG. 4 is a diagram for explaining in detail the creation of the TDFL according to a verify-after-write process. Here, data is processed in units of either sectors or clusters. A sector is the smallest unit of data that can be managed by a file system of a computer or an application program. A cluster is the smallest unit of data that can be physically recorded on a disc at a time. In general, at least one sector constitutes a cluster.

A sector is subdivided into a physical sector and a logical sector. The physical sector is a space of a disc where data corresponding to the sector is recorded. An address used to find the physical sector is called a physical sector number (PSN). The logical sector is a sector unit used to manage data in the file system or the application program. Likewise, a logical sector number (LSN) is assigned to the logical sector.

The data recording and/or reproducing apparatus finds the location of data to be recorded or reproduced on the write-once recording medium 100 using the PSN, manages all of the data in units of logical sectors in a computer or an application program for recording or reproducing data, and finds the location of the data using the LSN. The relationship between the LSN and the PSN is mapped by the control unit 2 according to defect generation and a location where data recording starts.

Referring to FIG. 4, A denotes a user data area and B denotes a spare area. In the user data area A and the spare area B, there is a plurality of physical sectors (not shown) to which PSNs are sequentially assigned. LSNs are assigned to at least one physical sector unit. However, the LSNs are assigned to replacement areas of the spare area B except for defective areas of the user data area A where defects are generated. As a result, although the physical sector and the logical sector are the same in size, if defective areas are generated, the PSNs and the LSNs become different.

The user data is recorded in the user data area A according to a continuous recording mode or a random recording mode. In the continuous recording mode, the user data is sequentially and continuously recorded. In the random recording mode, the user data is not necessarily continuously recorded, but is recorded at random. ①  through ⑦ indicate unit areas in which a verify-after-write operation is performed.

The data recording and/or reproducing apparatus records the user data in the unit area ①, the data recording and/or reproducing apparatus returns to the start of the unit area ① and verifies if the user data is recorded normally or if a defect is generated. If a cluster where a defect is generated is found, the cluster is identified as a defective cluster and is designated as a defective area, i.e., a defect #1, as shown in FIG. 4.

Also, the data recording and/or reproducing apparatus rewrites the user data recorded in the defect #1, in the spare area B. A part of the spare area B where the user data is rewritten is designated as a replacement #1. Next, after recording the user data in the unit area ②, the data recording and/or reproducing apparatus returns to the start of the unit area ② and verifies if the user data is recorded normally or if a defect is generated. If at least one cluster where a defect is generated is found, the at least one cluster is designated as a defect #2. In the same manner as above, a replacement #2 corresponding to the defect #2 is designated. Also, in the unit area ③, a defective area, i.e., a defect #3, and a replacement #3 corresponding to the defect #3 are designated. In the unit area ④, no defects are found and there are no defective areas.

After recording and verification are completed up to the unit area ④, if termination of a recording operation #1 is expected (e.g., if a user pushes an eject button or recording of the user data assigned to the recording operation #1 is completed), the data recording and/or reproducing apparatus creates, in the previous TDFL stored in the memory 3, a TDFL #1 where location information of the defects #1 through #3 that are generated in the unit areas ① through ④, and location information of the replacements #1 through #3 corresponding to the defects #1 through #3, are updated.

When the write-once recording medium 100 is again loaded into the data recording and/or reproducing apparatus, the control unit 2 reads the previously recorded TDFL #1 from the write-once recording medium 100 and stores the read TDFL #1 in the memory 3. Thereafter, once a recording operation #2 starts, data is recorded and defect management is performed in the same way as in the recording operation #1.

In other words, in the recording operation #2, verification after recording of the user data is performed from unit area ⑤ through ⑦, and thus, defects #4 and #5 and corresponding replacements #4 and #5 are designated. After the recording operation #2 is terminated, the data recording and/or reproducing apparatus creates, in the previous TDFL #1 stored in the memory 3, a TDFL #2 where location information of the defects #4 and #5 and location information of the replacements #4 and #5 are updated.

Figures 5, 6:
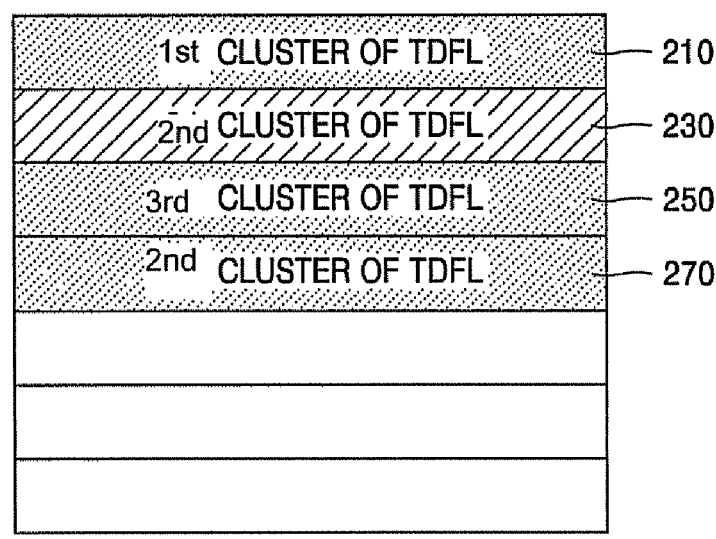
FIG. 5 illustrates an exemplary TDFL.
FIG. 6 is a diagram for explaining a verify-after-TDFL recording process according to an embodiment of the present invention.

FIG. 5 illustrates an exemplary TDFL. Referring to FIG. 5, location information of all defective clusters on the write-once recording medium 100 is included in the first column of the TDFL, and location information of replacement clusters corresponding to the defective clusters is included in the second column of the TDFL. In an aspect of this embodiment, the locations of the defective clusters or replacement clusters are indicated using PSNs of respective first sectors of the defective clusters or replacement clusters. However, the locations of the defective clusters or replacement clusters may be indicated using PSNs of respective last sectors of the defective clusters or replacement clusters, or using indices indicating the defective clusters or replacement clusters according to aspects of the invention.

Referring back to FIG. 3, once the TDFL is created as described above, the control unit 2 records the created TDFL in at least one cluster of the TDMA and verifies the recorded TDFL (operation S510). As a result of the verification, if a defective cluster is generated among clusters where the TDFL is recorded, the control unit 2 rewrites data recorded in the defective cluster, in another cluster of the TDMA (operation S530).

Two exemplary embodiments of verify-after-TDFL recording will now be described.

FIG. 6 is a view for explaining verify-after-TDFL recording according to an embodiment of the present invention. According to the shown embodiment of the present invention, when a TDFL whose size is equal to that of a plurality of clusters is recorded in a TDMA, the entire TDFL is recorded and then verified.

Referring to FIG. 6, the size of the TDFL is three clusters including a first cluster 210, a second cluster 230, and a third cluster 250, and the TDFL is recorded in the three clusters and then verified. As a result of the verification, it is determined that a defect is generated in the second cluster 230. Therefore, the data recorded in the second cluster 230 is rewritten in a cluster 270 next to the third cluster 250. After verification of the cluster 270, if it is determined that a defect is not generated in the cluster 270, recording of the TDFL is terminated and pointer information indicating the locations of the clusters in which the TDFL is recorded is included in the TDDS and the TDDS is recorded in the TDMA. At this time, the pointer information includes pointers indicating the locations of the first cluster 210 and the third cluster 250 where no defects are generated during initial recording, and the location of the cluster 270 that replaces the defective second cluster 230.

Figure 7:
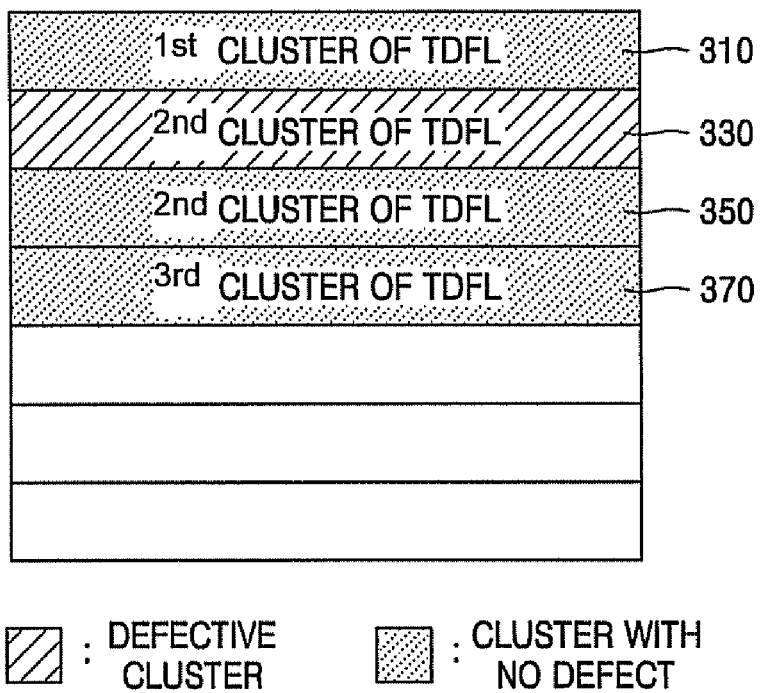
FIG. 7 is a diagram for explaining a verify-after-TDFL recording process according to an embodiment of the present invention.

FIG. 7 is a view for explaining verify-after-TDFL recording according to another embodiment of the present invention. According to the shown embodiment of the present invention, a TDFL has a size of three clusters. The TDFL is recorded in a first cluster 310 and then verified. As a result of the verification, it is determined that a defect is not generated in the first cluster 310. The TDFL is recorded in a second cluster 330 and then verified. As a result of the verification, it is determined that a defect is generated in the second cluster 330. Thus, the TDFL recorded in the second cluster 330 is rewritten in a cluster 350 next to the defective second cluster 330. After verification of the cluster 350, if it is determined that a defect is not generated in the cluster 350, a TDFL is recorded in a third cluster 370 and verified. After verification of the third cluster 370, if it is determined that a defect is not generated, recording of the TDFL is terminated, and pointer information indicating the locations of the clusters where the TDFL is recorded is included in the TDDS, and the TDDS is recorded in the TDMA. As in the embodiment of FIG. 6, the pointer information includes pointers indicating the locations of the first cluster 310 and the third cluster 370 where no defects are generated during initial recording, and the location of the cluster 350 that replaces the defective second cluster 330.

Figure 8:
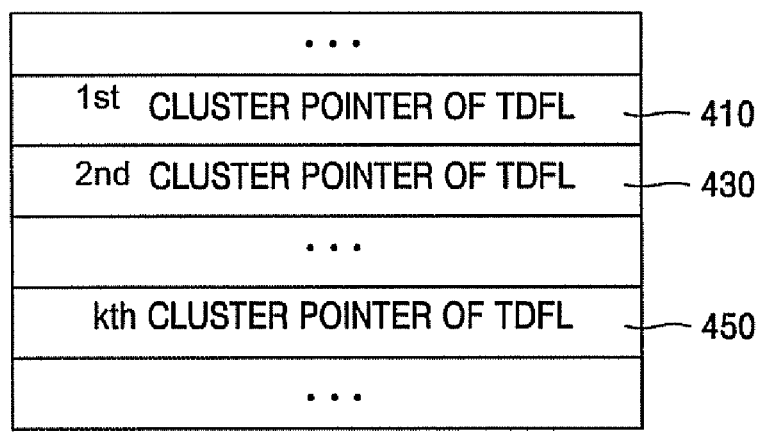
FIG. 8 illustrates exemplary pointer information indicating the location of the TDFL according to an embodiment of the present invention.

FIG. 8 illustrates exemplary pointer information indicating the location of the TDFL according to an aspect of the present invention. The pointer information shown in FIG. 8 includes k pointers 410, 430, and 450. The data recording and/or reproducing apparatus sequentially records the TDFL in k clusters by reproducing the pointer information shown in FIG. 8, and the locations of the k clusters can be seen.

In this embodiment, an $n^{th}$ cluster pointer of the TDFL (n is an integer ranging from 1 to k) has a size of 4 bytes. Also, the pointer information is included in the TDDS. In other words, the TDDS includes the pointer information indicating the location of the TDFL, information on a recordable location of a write condition test area, write protection information, and location and/or size information of a spare area assigned to a data area.

Because the TDDS should include the pointer information indicating the location of the TDFL, the TDDS should always be recorded after the TDFL is recorded.

As described above, according to the method and apparatus for recording the TDFL, the TDFL can be recorded with high reliability by performing the verify-after-write operation during the recording of the TDFL and rewriting the TDFL in another cluster if a defective cluster is generated. Also, when a defect is generated during recording of the TDFL, only data recorded in the defective cluster is recorded in a replacement cluster, instead of re-recording the entire TDFL. Referring to FIG. 3, in operation S550 the pointer information indicating the locations of clusters in which the TDFL is recorded normally is included in the TDDS, and the TDDS is recorded in the TDMA. Thus, it is possible to conserve the storage space in the TDMA.

A method and apparatus for reproducing the TDFL according to an embodiment of the present invention will now be described.

The apparatus for reproducing the TDFL uses the data recording and/or reproducing apparatus shown in FIG. 2. However, if the apparatus for reproducing the TDFL is a reproduction-only-apparatus, the recording/reading unit 1 and the control unit 2 may only perform data reading.

Figure 9:
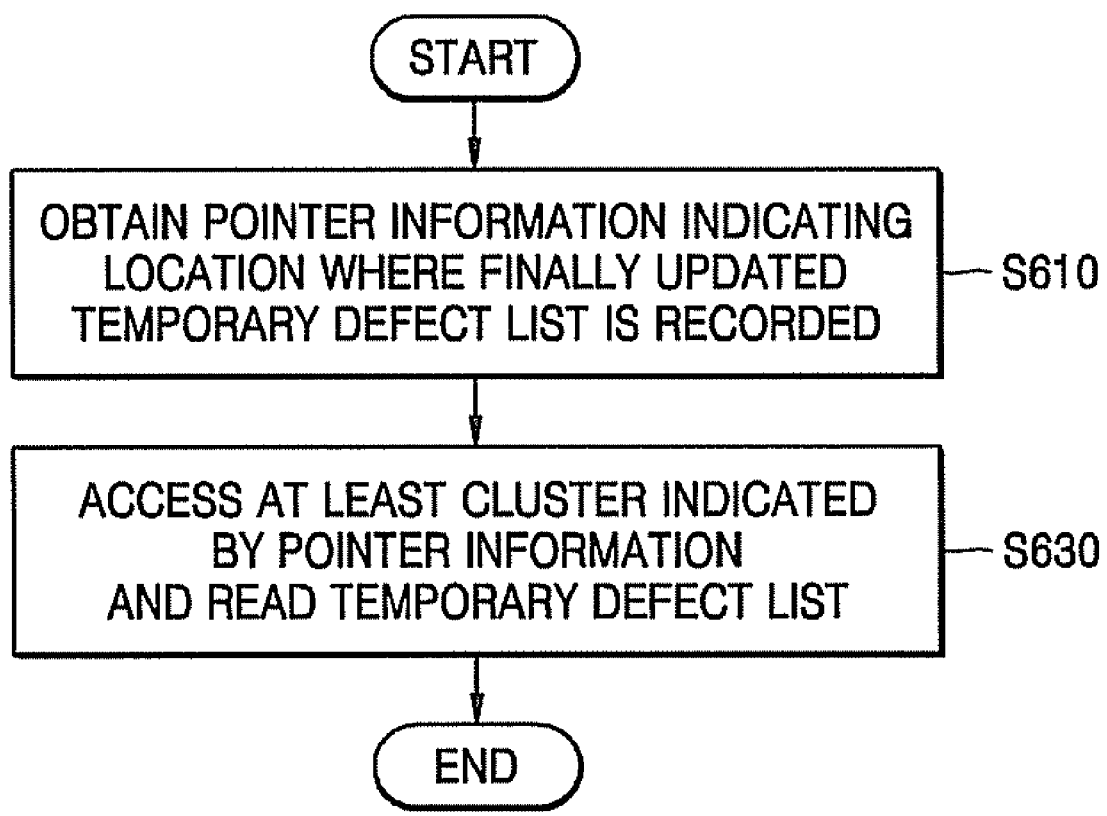
FIG. 9 is a flowchart illustrating a method of reproducing the TDFL according to an embodiment of the present invention.

FIG. 9 is a flowchart illustrating the method of reproducing the TDFL according to an embodiment of the present invention. Although not shown in the drawings, when the write-once recording medium 100 in which the user data, the TDFL, and the TDDS are recorded according to the method described above is loaded into the data recording and/or reproducing apparatus, the control unit 2 performs initialization in order to use the write-once recording medium 100. In other words, basic data required for use and management of the write-once recording medium 100 is read from the write-once recording medium 100.

In particular, after the updated TDDS is located and read, pointer information indicating the location of the updated TDFL is obtained from the updated TDDS (operation S610). The pointer information indicating the location of the updated TDFL has the structure shown in FIG. 8.

Since the control unit 2 can obtain from the pointer information the locations of clusters where the updated TDFL is recorded and an order in which the TDFL is recorded in the clusters, it reads the updated TDFL (operation S630). The control unit 2 stores the updated TDDS and TDFL that are read from the write-once recording medium 100 in the memory 3. The control unit 2 can flawlessly reproduce user data recorded on the write-once recording medium 100 with reference to the TDDS and TDFL stored in the memory 3.

As described above, according to the present invention, it is possible to more efficiently use areas of a write-once recording medium and more reliably record and reproduce the TDFL. In particular, a verify-after-write process is performed during recording of the TDFL and the TDFL is rewritten in another cluster if a defective cluster is generated. Thus, the TDFL can be recorded with high reliability. Here, when a defect is generated during recording of the TDFL, data recorded in a defective cluster is rewritten in a replacement cluster instead of re-recording the entire TDFL, the pointer information indicating the locations of the clusters where the TDFL is recorded normally is included in the TDDS, and the TDDS is recorded in the TDMA. Thus, the space for the TDMA is not used up quickly.

The present invention also can be implemented as computer readable codes in computer readable recording medium. The computer readable recording medium includes all kinds of recording apparatuses in which data that can be read by a computer system is stored. Such computer readable recording media are ROM, RAM, CD-ROM, magnetic tape, floppy disks, and optical data storage. Also, the computer readable recording medium can be distributed among computer systems connected via a network and the computer readable codes can be stored thereon and executed in a decentralized fashion.

Additionally, it is understood that the method of the present invention may be used in multiple types of media in which a TDMA is to be conserved, including writable optical media (such as CD-R, DVD-R), rewritable media (such as CD-R/W, DVD-R/W, DVD-RAM), magnetic and magneto-optical media, and next generation DVDs such as Bluray discs, advanced optical discs (AODs), E-DVD.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for recording and/or reproducing data with respect to a write-once recording medium, the apparatus comprising:
    a recording/reading unit which records data on or reads data from the write-once recording medium; and
    a control unit which
        controls the recording/reading unit to record temporary defect list data for defect management which comprises location information of defective data and replacement data corresponding to the defective data, in at least one cluster of a temporary disc management area of the write-once recording medium,
        verifies whether a defect is detected in the at least one cluster,
        when the defect is detected in the at least one cluster in which the temporary defect list data is recorded, controls the recording/reading unit to record data for replacing the temporary defect list data recorded in the at least one cluster in a replacement cluster of the temporary disc management area, and
    controls the recording/reading unit to record pointer information indicating a location of the replacement cluster in a temporary disc definition structure (TDDS),
    wherein the pointer information includes location information of the replacement cluster instead of the at least one cluster in which the temporary defect list data is recorded, and
    the temporary defect list data and the temporary disc definition structure and recorded in a disc management area provided on the write-one recording medium during finalization of the write-once recording medium.

2. The apparatus of claim 1, wherein the control unit completely records the temporary defect list data in the at least one cluster and verifies whether the defect is generated in the at least one cluster.

3. The apparatus of claim 1, wherein the control unit records and verifies the temporary defect list data in units of clusters.

4. The apparatus of claim 1, wherein the temporary defect list data and the temporary disc definition structure (TDDS) are recorded in a temporary disc management area (TDMA) provided on the write-once recording medium.

5. The apparatus of claim 1, wherein the temporary defect list data comprises first pointers indicating a plurality of the defective clusters of a user data area of the write-once recording medium and second pointers indicating a plurality of replacement clusters of a spare area corresponding to the defective clusters.

6. The apparatus of claim 1, wherein the data for replacing the temporary defect list data is recorded in a plurality of clusters of a temporary defect management area, wherein a portion of the temporary defect list data is recorded, and when a defect is detected in a first cluster among the plurality of clusters, a remaining portion of the temporary defect list data is recorded from a second cluster next to the first cluster, and
    the pointer information comprises a plurality of third pointers indicating the plurality of clusters in which the temporary defect list data is recorded, respectively, excluding the first cluster.

7. An apparatus for reproducing and/or recording data with respect to a write-once recording medium, the apparatus comprising:
    a reading unit which reads data recorded on the write-once recording medium; and
    a control unit which controls the reading unit to read pointer information indicating a location of a replacement cluster from a temporary disc definition structure (TDDS) in a temporary disc management area of the write-once recording medium, the replacement cluster comprising data recorded in at least one cluster in which a defect is detected from the at least one cluster in which temporary defect list data is recorded, and the temporary defect list data comprising location information of defective data and replacement data corresponding to the defective data, which accesses the replacement cluster, according to the pointer information,
    wherein the pointer information includes location information of the replacement cluster instead of the at least one cluster in which the temporary defect list data is recorded and
    the temporary defect list data and the temporary disc definition structure are recorded in a disc management area provided on the write-once recording medium during finalization of the write-once recording medium.

8. The apparatus of claim 7, wherein the pointer information indicates the location of the at least one cluster where the temporary defect list data is recorded.

9. The apparatus of claim 8, wherein the pointer information indicates the location of each cluster.

10. The apparatus of claim 7, wherein the temporary defect list data and the temporary disc definition structure are recorded in a temporary disc management area provided on the write-once recording medium.

11. A write-once recording medium for use with a recording and/or reproducing apparatus, comprising:
    at least one user data area for recording user data;
    at least one spare area for replacement of a corresponding portion of the user data area when a defect is detected in the corresponding portion of the user data area; and
    at least one temporary disc management area for recording temporary defect list data comprising location information of defective data and replacement data corresponding to the defective data for defect management, and a temporary disc definition structure (TDDS) comprising pointer information indicating to the recording and/or reproducing apparatus a location of a replacement cluster comprising data recorded in at least one cluster in which a defect is detected from the at least one cluster in which the temporary defect list data is recorded, wherein the pointer information includes location information of the replacement cluster instead of the at least one cluster in which the temporary defect list data is recorded, and the temporary defect list data and the temporary disc definition structure are recorded in a disc management area provided on the write-once recording medium during finalization of the write-once recording medium.

12. A method for recording and/or reproducing data with respect to a write-once recording medium, the method comprising:

recording temporary defect list data for defect management which comprises location information of defective data and replacement data corresponding to the defective data, in at least one cluster of a temporary disc management area of the write-once recording medium;

verifying whether a defect is detected in the at least one cluster;

when the defect is detected in the at least one cluster in which the temporary defect list data is recorded, recording data for replacing the temporary defect list data recorded in the at least one cluster in a replacement cluster of the temporary disc management area; and recording pointer information indicating a location of the replacement cluster in a temporary disc definition structure (TDDS), wherein the pointer information includes location information of the replacement cluster instead of the defective cluster, and the temporary defect list data and the temporary disc definition structure are recorded in a disc management area provided on the write-once recording medium during finalization of the write-once recording medium.

13. The method of claim 12, wherein the temporary defect list data comprises first pointers indicating a plurality of the defective clusters of a user data area of the write-once recording medium and second pointers indicating a plurality of replacement clusters of a spare area corresponding to the defective clusters.

14. The method of claim 12, wherein:

the data for replacing the temporary defect list data is recorded in a plurality of clusters of a temporary defect management area;

a portion of the temporary defect list data is recorded, and when a defect is detected in a first cluster among the plurality of clusters, a remaining portion of the temporary defect list data is recorded from a second cluster next to the first cluster; and the pointer information comprises a plurality of third pointers indicating the plurality of clusters in which the temporary defect list data is recorded, respectively, excluding the first cluster.

15. A method for reproducing data from a write-once recording medium, the method comprising:

obtaining pointer information indicating a location of a replacement cluster in which data for replacing temporary defect list data is recorded, from a temporary disc definition structure (TDDS) in the write-once recording medium, the temporary defect list data comprising location information of defective data and replacement data corresponding to the defective data; and accessing the replacement cluster in which data for replacing temporary defect list data is recorded, according to the pointer information, wherein the replacement cluster is a cluster in which data for replacing temporary defect list data is recorded when a defect is detected in at least one cluster of a temporary disc management area of the write-once recording medium, in which the temporary defect list data is recorded, and wherein the pointer information includes location information of the replacement cluster instead of the at least one cluster, and the temporary defect list data and the temporary disc definition structure are recorded in a disc management area provided on the write-once recording medium during finalization of the write-once recording medium.

16. The method of claim 15, wherein a temporary disc definition structure comprises the pointer information.

17. The method of claim 15, wherein the temporary defect list data comprises first pointers indicating a plurality of the defective clusters of a user data area of the write-once recording medium and second pointers indicating a plurality of replacement clusters of a spare area corresponding to the defective clusters.

18. The method of claim 15, wherein:

the data for replacing the temporary defect list data is recorded in a plurality of clusters of a temporary defect management area;

a portion of the temporary defect list data is recorded, and when a defect is detected in a first cluster among the plurality of clusters, a remaining portion of the temporary defect list data is recorded from a second cluster next to the first cluster; and the pointer information comprises a plurality of third pointers indicating the plurality of clusters in which the temporary defect list data is recorded, respectively, excluding the first cluster.

* * * * *